United States Patent [19]

Banham et al.

[11] 3,882,217

[45] May 6, 1975

[54] METHOD FOR THE PRODUCTION OF FREE-FLOWING POLYTETRAFLUOROETHYLENE MOLDING POWDERS

[75] Inventors: John Banham, Stevenage; Howard Edmund Browning, Welwyn, both of England

[73] Assignee: Imperial Chemical Industries Limited, London, England

[22] Filed: Nov. 16, 1973

[21] Appl. No.: 416,460

Related U.S. Application Data

[63] Continuation-in-part of Ser. No. 205,656, Dec. 7, 1971, abandoned.

[30] Foreign Application Priority Data

Dec. 11, 1970 United Kingdom............... 59005/70
July 26, 1971 United Kingdom............... 34952/71

[52] U.S. Cl.................................. 264/117; 264/127

[51] Int. Cl.............................................. B01j 2/12
[58] Field of Search........................... 264/117, 127

[56] References Cited
UNITED STATES PATENTS

| | | | |
|---|---|---|---|
| 3,265,679 | 8/1966 | Black et al.......................... | 264/117 |
| 3,527,857 | 9/1970 | Fitz................................... | 264/117 |
| 3,532,782 | 10/1970 | Hartwimmer...................... | 264/117 |

*Primary Examiner*—Robert F. White
*Assistant Examiner*—J. R. Hall
*Attorney, Agent, or Firm*—Cushman, Darby & Cushman

[57] ABSTRACT

Finely divided polytetrafluoroethylene powders are agglomerated by forming the agglomerates while the PTFE is wetted with a small amount of a solution of a volatile non-ionic surfactant in water, the concentration of surfactant in water being in excess of the critical micelle concentration.

11 Claims, No Drawings

METHOD FOR THE PRODUCTION OF FREE-FLOWING POLYTETRAFLUOROETHYLENE MOLDING POWDERS

This application is a continuation-in-part of U.S. Application Ser. No. 205,656 filed Dec. 7, 1971 and now abandoned.

This invention relates to a process for the production of free-flowing filled and unfilled moulding powders of granular polytetrafluoroethylene. Polytetrafluoroethylene is hereinafter referred to as PTFE.

Such granular polymers of high molecular weight are generally manufactured by polymerisation of tetrafluoroethylene in aqueous medium essentially in the absence of any surfactant.

In order to improve the physical properties of articles made from such granular polymers, the polymer is disintegrated after polymerisation. The best physical properties are obtained when the polymer has been disintegrated to a very small size, for example to an air sedimentation size, as hereinafter defined of less than 100 $\mu$m, especially less than 30 $\mu$m. Such a disintegration process is described in, inter alia, British Patent 853,338. Air sedimentation size is defined as the average particle size diameter $d_{50}$ in microns determined by measuring the air sedimentation rate of a representative sample of the PTFE powder using air sedimentation apparatus of the type, and following the procedures described in U.S. Pat. No. 2,597,899 using a column providing a free fall distance of 8 feet. As described in that patent, from the observed air sedimentation rate, the particle size distribution is determined by calculation from Stokes' law relating particle size to rate of fall. From a plot of the particle size distribution thus determined (i.e. a plot of cumulative weight percent of material against particle diameter $d$) the average particle size is taken as the particle diameter at 50 wt percent ($d_{50}$) on the distribution curve. Apparatus for performing air sedimentation particle size determinations by the techniques described in U.S. Pat. No. 2,597,899 is commercially available from the Franklin Electronics Corporation under the trade name "Micromerograph".

However, such finely disintegrated polymer powders have very poor powder-flow properties and a low bulk density. These two disadvantages render the polymer unsuitable for use in automatic moulding machines and so it is desirable to improve the bulk density and powder-flow properties.

Desirably a PTFE moulding powder should have a compacted flow rating of at least 16 and a compaction ratio of less than 4.3.

Compacted flow rating which is a measure of the flow properties of PTFE powder after being subjected to compacting conditions is determined according to the following procedure. A 5-inch (12.7 cm) high by 2-inch (5.08 cm) square hopper is filled with a sample of the resin to be tested. The bottom of the hopper consists of a removable screen with a slide valve directly beneath which when opened exposes the entire 2 × 2 inches (5.08 × 5.08 cm) screen area. Screens are provided having 1, 4, 9, 16, 25, 36 etc., openings per square inch (2.54$^2$ cm$^2$) corresponding to 1, 2, 3, 4, 5, 6, etc., meshes per lineal inch (2.54 cm). To carry out the test, the hopper is filled with uncompacted powder while the slide valve is closed. The hopper is subjected to vibrations for a period of one minute at a frequency of 60 cycles per second and at an amplitude of approximately 1/16 inch (0.16 cm) in order to compact the powder. The slide valve is then opened and with the hopper still vibrating at the same frequency and amplitude, it is observed whether powder flows through the screen. If powder flows through the screen, then the hopper is recharged with fresh powder, a smaller screen size is inserted, and the test repeated to determine whether the powder flows through the finer screen. The uncompacted flow rating is the number of openings per square inch (2.54$^2$ cm$^2$) of the finest screen through which flow is observed. The higher numbers, accordingly, indicate better flow characteristics.

Compaction ratio is related to the bulk density of the powder in the following manner:

$$\text{Compaction Ratio} = \frac{\text{True density}}{\text{Bulk density}}$$

For unfilled PTFE of which the true density is 2.15 g cm$^{-3}$ $$\text{Compaction Ratio} = \frac{2.15 \times 1000}{\text{Bulk density}}$$

where bulk density is expressed as g l$^{-1}$. Thus a compaction ratio of less than 4.3 corresponds, for unfilled PTFE, to a bulk density of more than 500 g l$^{-1}$.

For a filled PTFE in which the weight percentage of PTFE in the powder composition is x and the weight percentage of a filler of density $\rho$g cm$^{-3}$ is 100-x, then the true density, $\alpha$, expressed in g cm$^{-3}$, of the composition (which is the density of an article moulded from the composition) is given by the formula:

$$\alpha = \frac{215 \rho}{\rho x + 2.15(100-x)}$$

The powder flow and compaction ratio of the finely disintegrated powders may be improved by subjecting the finely divided polymer powder to an agglomeration process. The aim of such a process is to cause the finely divided particles to adhere together to form agglomerates which exhibit good powder-flow properties and which also have a low compaction ratio but which can be broken down upon moulding of the polymer powder so that the good mechanical properties given by the use of finely disintegrated material are retained.

Various methods have been proposed for effecting such agglomeration. One method of agglomeration is described in United Kingdom Patent Specification 1,076,642 wherein the polymer powder is wetted with a minor amount of a liquid having a low surface tension and the wetted powder is formed into agglomerates by, for example, a tumbling operation. After formation of the agglomerates, the liquid is removed by heating. However, the liquids used in that process are generally volatile organic materials and the heating operation gives rise to flammability or toxicity problems. In addition it would be desirable to use cheaper liquids than the aforesaid organic liquids.

According to this invention there is provided a process for the preparation of a free flowing filled or unfilled granular moulding powder which comprises the steps of wetting a fine particle size poorly flowing filled or unfilled granular PTFE powder wherein the PTFE particles have an air sedimentation size of less than 100 μm with an aqueous solution of a volatile non-ionic surfactant, the solution containing the surfactant in an amount of at least 40 times the critical micelle concentration at 20°C, and mechanically forming the wet filled or unfilled powder into filled or unfilled agglomerates respectively and drying the agglomerates, the mechanical forming being conducted at a temperature and for a time to obtain a moulding powder which when dry has a compacted flow rating of at least 16 and a compaction ratio of less than 4.3 By filled agglomerates we mean agglomerates of PTFE of which a substantial proportion contain filler material. Suitably the volume of the solution used is from 21.5 /α ml to 215 /α ml per 100 g of powder where α as defined above is the true density, in g cm⁻³, of the powder. The temperature at which the agglomeration is performed is generally 10° to 60°C.

Generally it is desirable that at least 50 percent by weight of the dried agglomerates have a size, as measured by dry sieving in the range 150 to 2000 μm. By dry sieve size, or size as measured by dry sieving, we mean the average particle size diameter in microns determined by the following dry sieving technique: a series of U.S. Standard Sieve Series, 8 inches (20.32 cm) in diameter, numbers 10, 18, 25, 40 and 60 are employed stacked on one another in order, from top to bottom, of decreasing sieve opening size. A sample of the agglomerated powder 50 grams in size is placed on the top sieve and the stack is gently shaken and tapped for about 1 minute to shake down the smaller particles. The topmost sieve (No. 10) is removed and the stack is again shaken about 1 minute after which the top sieve (No. 18) is removed and the stack is again shaken and tapped and so on until the powder has been fractioned between the 5 sieves. The weight of sample on each sieve is determined and from this data the particle size distribution curve is drawn by plotting the cumulative percent of sample on each sieve versus the average opening size of the respective sieves. The dry sieve particle size is taken as the particle diameter at 50 wt percent on the particle size distribution curve thus determined.

It is preferred that the surface tension of the surfactant solution to be added should be between 28 and 40 dyne cm⁻¹ at 20°C.

When a surfactant is added to water, the surface tension of the aqueous solution is reduced. A plot of surface tension of the solution against surfactant concentration shows that, as the surfactant concentration is increased, the surface tension drops sharply until the surfactant concentration reaches the critical micelle concentration. Increasing the surfactant concentration above the critical micelle concentration causes relatively little change in the surface tension of the solution.

The surfactant that is used in the present invention is non-ionic. By the term non-ionic surfactant we mean a non-ionic material having a molecular structure of a hydrophilic portion at one end of the molecule and a hydrophobic portion at the other end of the molecule. In contrast those non-ionic materials known as protective colloids such as partially hydrolysed polyvinyl acetates have hydrophilic portions distributed along the chain of the molecule with no discrete hydrophobic portion. The use of protective colloid solutions as agglomerating liquids is described in U.S. application Ser. No. 205,657, filed Dec. 7, 1971, now abandoned and refiled as continuation application Ser. No. 473,913 on May 28, 1974.

It is also necessary that the surfactant should be volatile, that is, it should volatilise at a temperature below the sintering temperature of PTFE. If the surfactant is not volatile, as is the case with most commercially available ionic surfactants, residues resulting therefrom will not be removed on heating the polymer powder and this may give rise to poor mechanical properties and discoloration of the moulding. Particularly suitable non-ionic surfactants are condensates of ethylene oxide and alkyl phenols, for example, polyoxyethylated nonyl phenol containing 9 to 10 moles of ethylene oxide per mole of nonyl phenol, and the condensates of ethylene oxide and long chain alcohols.

As mentioned above, it is necessary that an excess of the surfactant is used. The amount of surfactant should be at least 40 times the critical micelle concentration, as measured at 20°C, and is preferably less than 150 times the critical micelle concentration, as measured at 20°C. The use of larger quantities of surfactant offer no further advantages, and, of course, give rise to larger amounts of surfactant that have to be removed by volatilisation.

Polyoxyethylated nonyl phenol containing 9 to 10 moles of ethylene oxide per mole of nonyl phenol has a critical micelle concentration at 20°C of about 0.01 percent by weight. When using this surfactant the aqueous solution preferably contains 0.5 to 1.2 percent by weight of the surfactant.

It will be appreciated that after drying the agglomerates, they will generally be moulded and sintered as in normal PTFE moulding techniques. Prior to the moulding process it is generally desirable to heat the agglomerates at a temperature above the volatilisation temperature of the surfactant but below the sintering temperature of PTFE for sufficient time to volatilise substantially all the surfactant as volatilisation of the surfactant during sintering may give rise to voids in the moulding. Preferably the heating step is carried out at a temperature of from 260° to 300°C. However, in some cases it may be possible to eliminate this heating step and remove the surfactant during the sintering process.

The amount of aqueous surfactant solution used is preferably within the range 65/α ml to 130/α ml, particularly 75/α ml to 110/α ml per 100 g of powder being agglomerated where α is the true density of the composition in gm cm⁻³. For unfilled powder compositions, this corresponds to a preferred range of approximately 25 to 50, particularly 30 to 45 ml per 100 g of PTFE. Typically an amount of 35 to 40 ml per 100 gm of PTFE may be used.

To effect the agglomeration, the powder in admixture wtih the aqueous surfactant solution is subjected to the mechanical blending operation which causes the resin particles to clump together. Preferably, the aqueous solution of the surfactant is added to the powder while the powder is tumbled in a blender. A preferred form of apparatus for conducting the agglomeration process is a Y-blender provided with a liquid dispersion and cutter device, through which the aqueous solution of the surfactant may be sprayed into the powder as it is tumbled in the blender.

The temperature at which the blending is performed affects the degree of agglomeration. The higher the temperature, the more readily will the particles agglomerate. As the blending temperature is increased, in addition to the readiness with which the particles agglomerate, the agglomerates become harder, and so are less readily broken down in transportation.

On the other hand use of higher temperatures can have an adverse effect on the physical properties e.g. tensile properties of sintered mouldings made from the agglomerated particles.

We have found that for unfilled PTFE compositions, and compositions containing a relatively small proportion of filler of relatively low density, the blending should be conducted with the polymer at a temperature of from 10° to 40°C and preferably at a temperature within the range 15° to 30°C. Generally there is little point in agglomeration temperatures below 0°C, as at such temperatures there is the risk of freezing the surfactant solution. The above temperatures are generally suitable for compositions containing less than 30 percent by volume of fillers of density of less than 4 g cm$^{-3}$.

Where dense fillers and/or large volumes of filler are used, stronger agglomerates are necessary as in some cases the larger agglomerates tend to act as the balls of a ball mill during the blending operation and cause the smaller agglomerates formed to break down again. In other cases the filled compositions just will not agglomerate readily at such temperatures. We have found that compositions containing large amounts, for example greater than 30 percent by volume, of filler and/or dense fillers, for example those fillers having densities greater than 4 g cm$^{-3}$, can be made into satisfactory agglomerates at higher temperatures; the more the filler used and/or the denser the filler, then the higher the optimum temperatures. The temperature used should not exceed the cloud point of the surfactant solution.

For example a PTFE composition containing 60 percent by weight of bronze of density about 9 i.e. about 27 percent by volume showed virtually no tendency to form agglomerates at a temperature of 0°C. At 20°C the agglomerates formed were very fragile and poorly formed. At a temperature of 50°C, however, good agglomerates were obtained. Similar results were obtained when using a PTFE composition containing 40 percent by volume of a mixture of graphite and bronze.

Simple experimentation will determine the optimum agglomeration temperature, whether the PTFE is filled or unfilled. It will, however, be clear to those skilled in the art that there may be filled materials which by reason of the large proportion, or large size of the filler cannot be satisfactorily agglomerated and it is not intended that the process of the invention should be applied to such materials.

After drying the agglomerated powder, agglomerates of a certain size range can if desired be selected by sieving the powder through a mesh or meshes of the appropriate size. It is thus possible to remove particles in excess of, for example, 2000 μm, and also to remove fines, and these oversized and undersized agglomerates can be recycled. When using the preferred form of Y-blender, for example, this can be done by feeding the oversized and undersized agglomerates together with virgin polymer to the Y-blender and disintegrating the agglomerates and mixing them with the virgin polymer using the cutter device before adding the agglomerating liquid. The agglomeration process can be continued for sufficient time so that a large proportion, for example at least 80 percent by weight of all the agglomerates have a size in the range 150 μm to 2000 μm as measured by dry sieving. Increasing the agglomeration time of course gives rise to agglomerates of larger sizes.

In addition to forming agglomerates of PTFE, the invention is of particular use in formation of agglomerates of PTFE with fillers such as glass, graphite, coke powder, bronze and polymeric fillers such as polyimides. The proportion of filler in the filled composition is normally such that the final moulding of PTFE contains from 5 to 40 percent by volume of filler.

The invention is illustrated by the following examples.

In the Examples, a commercially available unfilled granular PTFE moulding powder having a dry sieve size as previously defined of 300 to 350 μm was disintegrated by means of a mill to particles having an air sedimentation size of 20 μm.

EXAMPLE 1

In this example, which is by way of comparison, a surfactant solution wherein the surfactant concentration was only 10 times the critical micelle concentration was used.

67.5 parts by weight of the finely milled PTFE powder to which 22.5 parts by weight of powdered coke had been mixed were blended with 42 parts by weight of a 0.1 percent aqueous solution of a polyoxyethylated nonyl phenol containing 9 to 10 moles of ethylene oxide per mole of nonyl phenol at 20°C in a conventional liquid-solids Y-blender. Free water could be seen in the mixture, and it was apparent that the polymer was not being wetted. After tumbling for 30 minutes, the mixture was removed from the blender and dried for 16 hours at 120°C. The agglomerates were sieved through a B.S. 16 mesh sieve (which has an aperture size of about 1000 μm) and 16 percent by weight of the agglomerates were retained on this mesh. The material passing through the mesh had a compaction ratio of 4.34, a weight average particle size of 335 μm, as measured by dry sieving, and a compacted flow rating of 1.

Similar results were obtained using graphite in place of powdered coke.

EXAMPLE 2

In this example, which is also by way of comparison, the surfactant concentration was 25 times the critical micelle concentration. 62.5 parts by weight of the finely milled PTFE powder to which 22.5 parts by weight of finely divided graphite had been mixed were blended, by the procedure of Example 1, with 30 parts by weight of a 0.5 percent by weight aqueous solution of a surfactant sold by Rohm & Haas Company under the trade mark "Triton" DN65 and described by the suppliers as a modified ethoxylated straight chain alcohol. This surfactant had a critical micelle concentration of about 0.02 percent by weight. As in Example 1, free water could be seen in the mixture and it was apparent that the polymer was not being wetted. After a further 30 minutes tumbling, the mixture was removed from the blender and dried for 16 hours at 120°C. The product was sieved through a B.S. 16 mesh sieve, 17 percent by weight being retained on the sieve. The fraction passing through the sieve had a compaction ratio of 3.86, a weight average particle size of 275 μm as measured by dry sieving, and a compacted flow rating of 9.

EXAMPLE 3

In this example the surfactant concentration was 100 times the critical micelle concentration. 62.5 parts by weight of the finely milled PTFE powder to which 22.5 parts by weight of finely divided graphite had been mixed were blended, by the procedure of Example 1, with 35 parts by weight of 1 percent by weight aqueous solution of the polyoxyethylated nonyl phenol used in Example 1. No free water could be seen, and it was therefore assumed that the polymer was wetted by the solution. After tumbling for 60 minutes, the mixture was removed from the blender and dried for 16 hours at 120°C. After sieving through a B.S. 16 mesh sieve, on which 20 percent by weight of the product was retained, the fraction passing through the sieve had a compaction ratio of 3.1, a weight average particle size of 459 $\mu$m as measured by dry sieving, and a compacted flow rating of 36. The material retained by the sieve was suitable for mixing with a further blend of the milled PTFE powder and finely divided graphite and tumbling dry in the Y-blender to disintegrate the agglomerates. This mixture could then be agglomerated as described above. The product passing through the sieve was spread on trays and baked for 180 minutes at 280°C in an air oven to remove the surfactant. The baked agglomerates could be moulded easily by an automatic preforming machine and, on sintering preforms made thereby, gave satisfactory void free mouldings.

EXAMPLE 4

In this example the surfactant concentration was 50 times the critical micelle concentration. 62.5 parts by weight of the finely milled PTFE powder to which 22.5 parts by weight of finely divided graphite had been mixed were blended, by the procedure of Example 1, with 35 parts by weight of a 1 percent by weight aqueous solution of the surfactant used in Example 2. No free water could be seen after tumbling for 60 minutes. The mixture was removed from the blender and dried for 16 hours at 120°C. On sieving through a B.S. 16 mesh sieve, 11 percent by weight was retained on the sieve. The fraction passing through the sieve had a compaction ratio of 3.22, a weight average particle size of 400 $\mu$m as measured by dry sieving, and a compacted flow rating of 25.

EXAMPLE 5

This example and Examples 6 and 7 show the benefit of agglomerating a mixture containing a large volume of a dense filler at temperatures above ambient.

68 parts by weight of the finely-milled PTFE powder to which 102 parts by weight of finely divided bronze had been mixed, were blended at 20°C by the procedure of Example 1, with 42.5 parts by weight of a 1 percent by weight solution of the Triton DN65 surfactant used in Example 2. After 30 minutes tumbling the mixture was removed from the blender and dried for 16 hours at 120°C. The product was sieved through a B.S. 16 mesh sieve and 33 percent by weight was retained on the sieve. The fraction passing through the sieve had a compaction ratio of 3.10, a weight average particle size of 275 $\mu$m as measured by dry sieving, and a compacted flow rating of 9.

EXAMPLE 6

The agglomeration of Example 5 was repeated, but at 5°C. All other details of the agglomeration remained the same.

13 percent by weight of the product was retained on a B.S. 16 mesh sieve. The product passing through the sieve had a compaction ratio of 3.83, a weight average particle size of less than 100 $\mu$m as measured by dry sieving, and a compacted flow rating of 1.

EXAMPLE 7

The agglomeration of Example 5 was repeated again, but at 50°C. All other details of the agglomeration remained the same.

22 percent by weight of the product was retained on a B.S. 16 mesh sieve. The product passing through the sieve had a compaction ratio of 2.90, a weight average particle size of 320 $\mu$m as measured by dry sieving, and a compacted flow rating of 36.

EXAMPLE 8

In this example the surfactant concentration was 50 times the critical micelle concentration. 80 parts by weight of the finely milled PTFE were blended by the procedure of Example 1 with 27.5 parts by weight of a 1 percent by weight aqueous solution of the Triton DN65 surfactant used in Example 2. After 15 minutes tumbling, the mixture was removed and dried for 16 hours at 120°C. On sieving through a B.S. 16 mesh sieve, 39 percent by weight was found to be retained by the sieve. The fraction passing through the sieve had a compaction ratio of 3.04, a weight average particle size of 340 $\mu$m, as measured by dry sieving, and a compacted flow rating of 36.

We claim:

1. A process for the preparation of a free flowing granular moulding powder containing polytetrafluoroethylene which comprises the steps of wetting a fine particle size granular polytetrafluoroethylene powder wherein the particles have an air sedimentation size of less than 100 $\mu$m with an aqueous solution of a nonionic surfactant which volatilises at a temperature below the sintering temperature of polytetrafluoroethylene, the solution containing the surfactant in an amount of at least 40 times the critical micelle concentration at 20°C, the solution being used in an amount from 21.5/$\alpha$ ml to 215/$\alpha$ ml per 100 gm of the fine particle size powder where $\alpha$ is the true density in gm/cm$^3$ of the powder and forming the wet powder into agglomerates by mechanical agitation, and drying the agglomerates, the mechanical agitation being conducted at a temperature and for a time to obtain a moulding powder which when dry has a compacted flow rating of at least 16 and a compaction ratio of less than 4.3.

2. A process according to claim 1 wherein at least 50 percent by weight of the dried agglomerates have a size in the range 150 to 2000 $\mu$m as measured by dry sieving.

3. A process according to claim 1 wherein the surface tension of the surfactant solution to be added is between 28 and 40 dyne cm$^{-1}$ at 20°C.

4. A process according to claim 1 wherein the agglomerates are formed at a temperature from 10° to 60°C.

5. A process according to claim 1 wherein the nonionic surfactant is chosen from the group consisting of condensates of ethylene oxide and alkyl phenols and condensates of ethylene oxide and long chain alcohols.

6. A process according to claim 3 wherein the agglomerates are heated at a temperature above the volatilisation temperature of the surfactant but below the sintering temperature of the polytetrafluoroethylene for sufficient time to volatilise substantially all the surfactant.

7. A process according to claim 1 wherein to effect the agglomeration, the aqueous solution of the surfactant is added to the powder while the powder is tumbled in a blender.

8. A process according to claim 1 for agglomerating polytetrafluoroethylene containing less than 30 percent by volume of filler of density less than 4 gm cm$^{-3}$ wherein the agglomeration takes place at a temperature from 10°–40°C.

9. A process according to claim 1 wherein after drying, the agglomerated powder is sieved to select agglomerates of a desired size range.

10. A process according to claim 1 wherein the agglomerates after drying are moulded into a shaped article.

11. A process according to claim 1 wherein the agglomeration is carried out at 10°–40°C.

* * * * *